United States Patent
Hung (10) Patent No.: US 9,700,910 B2
(45) Date of Patent: Jul. 11, 2017

(54) SPRINKLER STRUCTURE

(71) Applicant: RUEY RYH ENTERPRISE CO., LTD., Changhua (TW)

(72) Inventor: Chen-Fu Hung, Changhua (TW)

(73) Assignee: Ruey Ryh Enterprise Co., Ltd., Changhua County (TW)

( * ) Notice: Subject to any disclaimer, the term of this patent is extended or adjusted under 35 U.S.C. 154(b) by 201 days.

(21) Appl. No.: 14/811,530

(22) Filed: Jul. 28, 2015

(65) Prior Publication Data
US 2017/0028427 A1    Feb. 2, 2017

(51) Int. Cl.
  *B05B 3/04* (2006.01)
  *B05B 15/06* (2006.01)
  *F16K 31/16* (2006.01)

(52) U.S. Cl.
  CPC .......... *B05B 15/065* (2013.01); *B05B 3/0422* (2013.01); *F16K 31/16* (2013.01)

(58) Field of Classification Search
  CPC ....... B05B 15/065; B05B 3/0422; B05B 3/04; B05B 3/0477; B05B 3/0431; B05B 3/16; B05B 3/0436; F16K 31/16
  USPC ............ 239/225.1, 237, 239, 242, 263, 264, 239/263.3, 240
  See application file for complete search history.

(56) References Cited

U.S. PATENT DOCUMENTS

| | | | |
|---|---|---|---|
| 7,484,674 B1* | 2/2009 | Wang | B05B 3/0436 239/232 |
| 8,746,592 B2* | 6/2014 | Lo | B05B 1/3026 239/113 |
| 2014/0070023 A1* | 3/2014 | Hsieh | B05B 3/0409 239/242 |

* cited by examiner

*Primary Examiner* — Jason Boeckmann
(74) *Attorney, Agent, or Firm* — Senniger Powers LLP (57) ABSTRACT

An improved sprinkler structure provides a fastener of a positioning ring for elastically fastening a water guiding pipe. A fastening dot of the positioning ring can engage with a tooth of a water inlet connector effectively so that the water guiding pipe does not detach easily. Water outlet direction of a first water passage and a second water passage is tangent with an impeller; therefore, when water is let out, the water pressure will push the impeller evenly to make the sprinkler to rotate evenly and smoothly. A push rod of a water inlet switching device is pivotally connected with a connecting rod. When the connecting rod is pushed, because a clearance is present between the connecting rod and a connecting groove, the force received by the connecting rod is partially converted into momentum of displacement when the push rod wiggles.

5 Claims, 7 Drawing Sheets

SPRINKLER STRUCTURE

BACKGROUND OF THE INVENTION

Field of Invention

The present invention relates to an improved sprinkler structure.

Related Art

Figure 1:
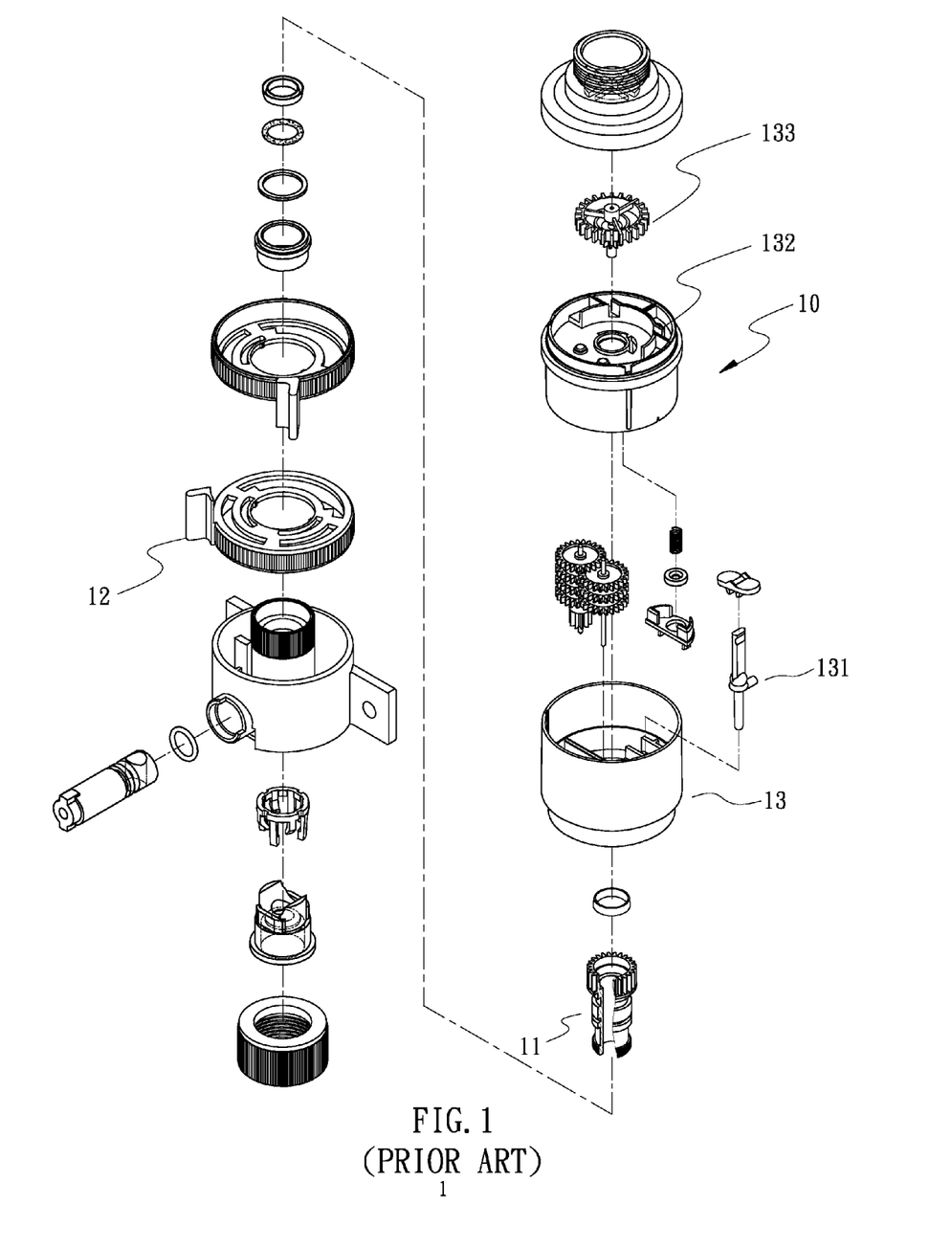
FIG. 1 is an explosive perspective view of an improved sprinkler structure disclosed in a Taiwanese patent (patent certificate number 1353888).

Conventionally, as illustrated in the structures in FIG. 1 of an exploded perspective view of "Improved Sprinkler Structure" with Taiwanese patent certificate number 1353888, a water guiding pipe 11 inside a sprinkler 10 is used for guiding water in. A positioning connector 12 is used for controlling the wiggling direction of a push rod 131 inside a movable seat 13 in order to control the direction of a wiggling seat 132 in order to change the direction of water flowing out from a water guiding passage 133 disposed above. Thereby, the rotation direction of an impeller 134 can be controlled and the rotation of the sprinkler 10 can also be controlled. Furthermore, as illustrated in the structures in FIG. 2 of a sectional view of "Automatic Water Inlet Switching Device of Sprinkler" with Taiwanese patent certificate number 1273883, a manual push rod 131 is disposed inside a movable seat 13 of a sprinkler 10. Through the wigging of the push rod 131, the direction of a movable wiggling seat 132 can be changed in order to change the direction of water flowing out from a water guiding passage 133.

Figure 2:
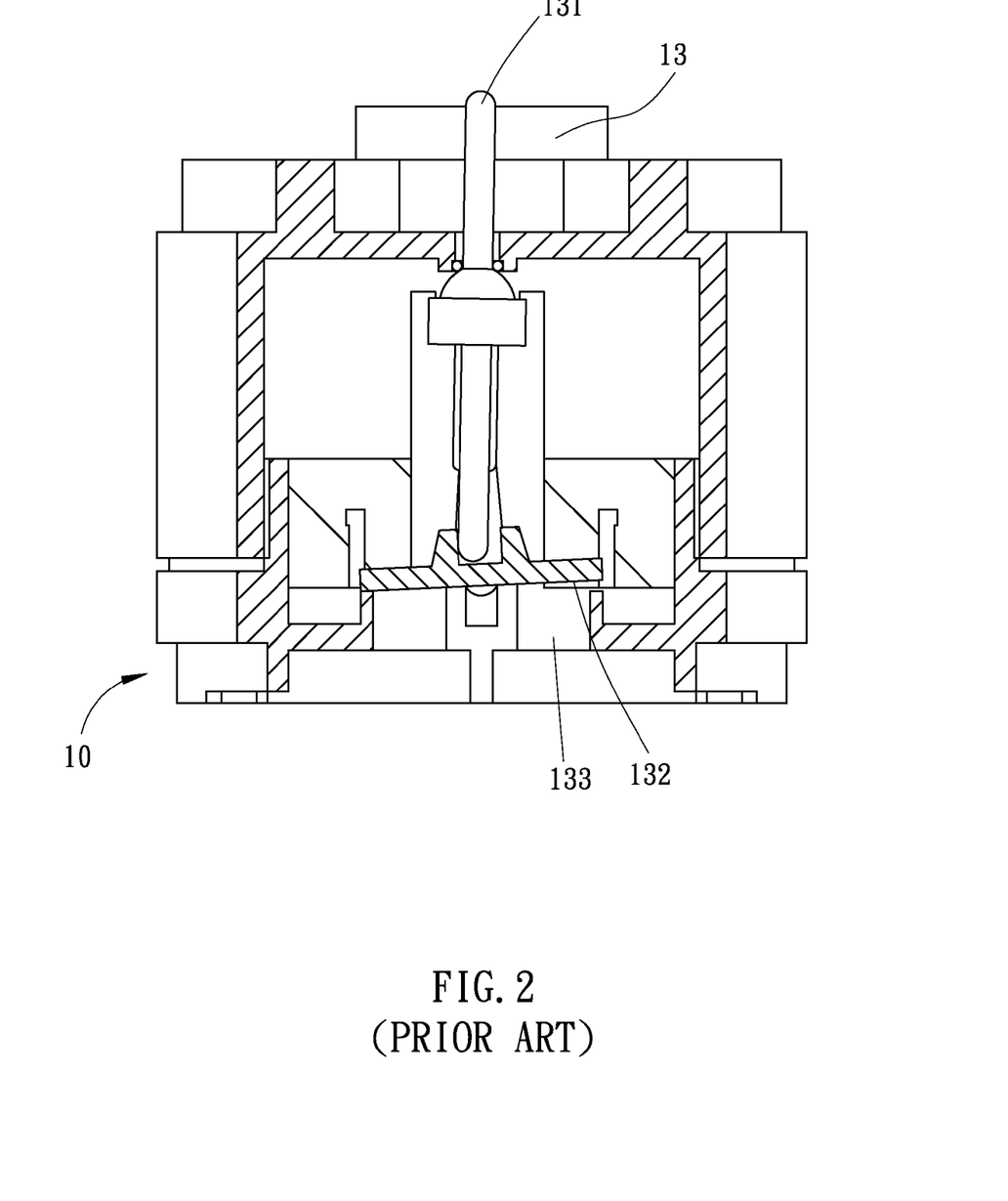
FIG. 2 is a sectional view of an automatic water inlet switching device of sprinkler disclosed in Taiwanese patent (patent certificate number 1273883).

However, as shown in FIG. 1, the water guiding passage 133 of the conventional sprinkler 10 is perpendicular to the impeller 134. The water current pressure impacts the impeller 134 directly to cause the impeller 134 to rotate too fast. As a result, the sprinkler 10 wiggles too fast and cannot sprinkle water evenly and stably. Because the push rod 131 inside the sprinkler 10 for controlling the water current direction is formed as one plastic piece and the push rod 131 gets old and embrittles easily, the sprinkler 10 cannot change direction. As shown in FIG. 2, in order for the push rod 131 to be able to push the movable wiggling seat 132, the length of the push rod 131 has to be long enough to be able to generate enough acting force to move the movable wiggling seat 132. As a result, the push rod 131 gets damaged easily because of the excess force exerted on it or if it is operated improperly.

SUMMARY OF THE INVENTION

An improved sprinkler structure provided by the present invention comprising:

a water guiding pipe, a limiting protruded rib disposing at an end of the water guiding pipe, a fixing teeth end disposing at another end of the water guiding pipe, a positioning ring being engagedly disposed on the limiting protruded rib, a fastener being elastically disposed inside the positioning ring, the fastener being limited by the limiting protruded rib, a fastening dot being disposed on an outer side of the positioning ring;

a water inlet connector, a pipe connecting groove passing through the water inlet connector, a tooth being protrudingly and annularly disposed inside the pipe connecting groove, the water guiding pipe having the limiting protruded rib disposing inside the pipe connecting groove, the fastening dot disposing on the positioning ring being engaged with the tooth, the fixing teeth end being protruded outside the water inlet connector;

a limiting connector, a connecting ring passing through a center of the limiting connector, the connecting ring being pivotally disposed on the water inlet connector, limiting spaces passing through the limiting connector annularly;

a movable seat composed of a bottom box and a cover, an accommodating space being formed between the bottom box and the cover, a teeth hole passing through a bottom of the bottom box for the fixing teeth end to go through the accommodating space, a pivotal connecting hole being disposed by a side of the teeth hole, a limiting rod being protrudingly disposed by an outer side of the pivotal connecting hole, the limiting rod being disposed inside the limiting space, an axial hole passing through a center of the cover, a first water outlet hole and a second water outlet hole passing through a side of the cover, the first water outlet hole and the second water outlet hole disposing by two sides of an axis of the cover, a separating board being disposed between the first water outlet hole and the second water outlet hole, a stopping board being horizontally and extendedly disposed by two sides of an end of the separating board near the axial hole, the stopping board being disposed in front of the first water outlet hole and the second water outlet hole, a first guiding board and a second guiding board being protrudingly disposed on the cover by the first water outlet hole and the second water outlet hole respectively, the first guiding board and the second guiding board and the separating board are roughly parallel to each other, a first water passage being formed between the first guiding board and the stopping board, a second water passage being formed between the second guiding board and the stopping board, the first water passage and the second water passage being parallelly disposed by two sides of the axis of the cover, a pressure relief hole being penetratedly disposed on the cover;

a water inlet switching device comprising a push rod, a connecting rod and a wiggling piece, an end of the push rod being pivotally connected with the pivotal connecting hole of the bottom box, the push rod being limited inside the limiting space, a connecting groove being concavely disposed at another end of the push rod, the connecting rod being pivotally disposed inside the connecting groove, a diameter of the connecting rod being smaller than a hole diameter of the connecting groove so that the connecting rod wiggling deflectively inside the connecting groove, the wiggling piece being pivotally disposed on the cover corresponding to the first water outlet hole and the second water outlet hole, the wiggling piece being disposed on top of the connecting rod, the wiggling piece selectively opening the first water outlet hole or the second water outlet hole;

a gear wheel set comprising an impeller and a transmission gear set, the impeller being pivotally disposed on the axial hole of the cover, the first water passage and the second water passage being tangent with the impeller, the transmission gear set being engaged with the impeller and the fixing teeth end; and a water outlet connector covering on the cover, a water outlet hole being penetratedly disposed on the water outlet connector, a pressure relief rod being protrudingly disposed on the water outlet connector corresponding to the pressure relief hole of the cover, an elastic element and a pressure relief pad being sleeved around the pressure relief rod, the elastic element pressing the pressure relief pad elastically on the pressure relief hole tightly.

An improved sprinkler structure of the present invention provides the fastener of the positioning ring for elastically fastening the water guiding pipe. The fastening dot of the positioning ring can engage with the tooth of the water inlet connector effectively so that the water guiding pipe does not detach easily. The water outlet direction of the first water passage and the second water passage is tangent with the impeller; therefore, when water is let out, the water pressure will push the impeller evenly to make the sprinkler to rotate evenly and smoothly. The push rod of the water inlet switching device is pivotally connected with the connecting rod. When the connecting rod is pushed, because a clearance is present between the connecting rod and the connecting groove, the force received by the connecting rod is partially converted into momentum of displacement when the push rod wiggles. Thereby, the force received by the connecting rod is reduced in order to increase the lifespan.

The present invention will become more fully understood by reference to the following detailed description thereof when read in conjunction with the attached drawings.

DETAILED DESCRIPTION OF THE INVENTION

Figure 3:
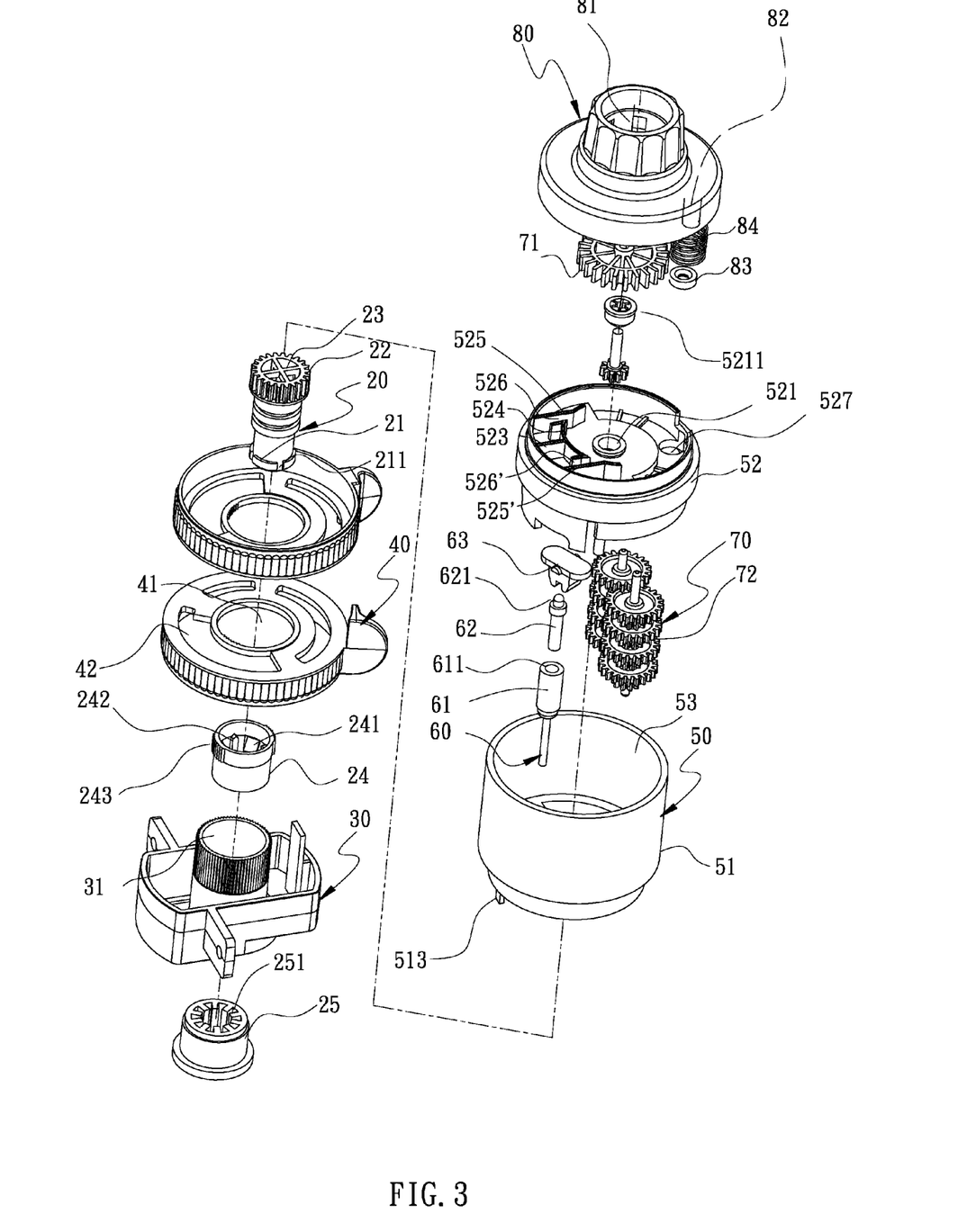
FIG. 3 is an explosive perspective view of an improved sprinkler structure of the present invention.
Figure 4:
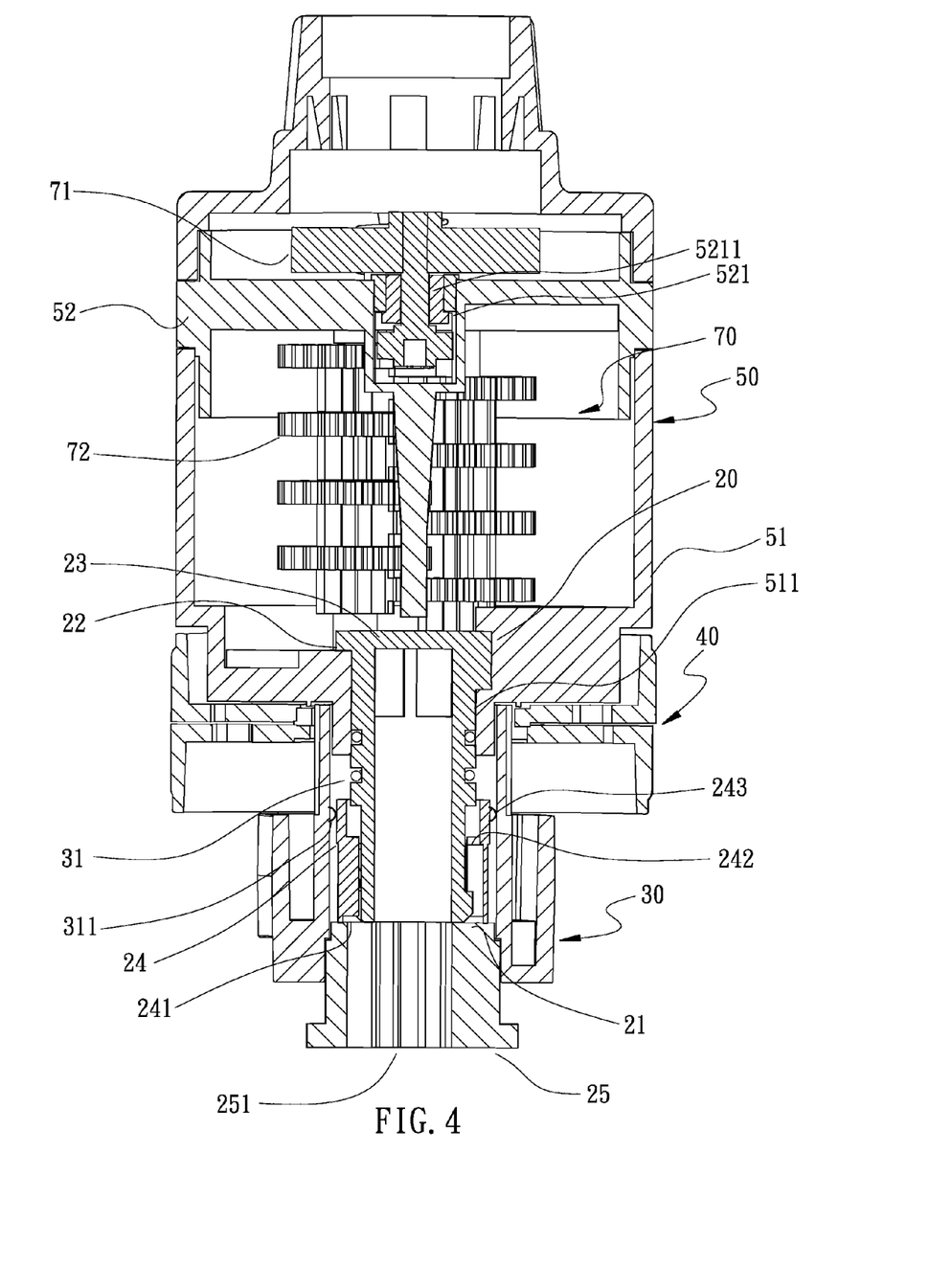
FIG. 4 is a sectional assembly view of a water guiding pipe and a water inlet connector of the present invention.

An improved sprinkler structure is provided by the present invention. Please refer to FIGS. 3 and 4. FIG. 3 is an explosive perspective view of the improved sprinkler structure of the present invention; and FIG. 4 is a sectional assembly view of a water guiding pipe and a water inlet connector of the present invention. The improved sprinkler structure comprises a water guiding pipe 20, a water inlet connector 30, a limiting connector 40, a movable seat 50, a water inlet switching device 60, a gear wheel set 70 and a water outlet connector 80.

A limiting protruded rib 21 is disposed at an end of the water guiding pipe 20. A plurality of positioning grooves 211 is concavely and annularly disposed on the limiting protruded rib 21. A fixing teeth end 22 is disposed at another end of the water guiding pipe 20. A stopping portion 23 is disposed at and end surface of the fixing teeth end 22 of the water guiding pipe 20. A positioning ring 24 is engagedly disposed on the limiting protruded rib 21. A fastener 241 is elastically disposed inside the positioning ring 24. A positioning protruded piece 242 is protrudingly disposed on an inner side of the positioning ring 24 corresponding to the positioning groove 211. The fastener 241 is limited by the limiting protruded rib 21. A fastening dot 243 is protrudingly disposed on an outer side of the positioning ring 24. A water inlet pipe 25 is further connected with an outer side of the positioning ring 24. A plurality of stopping ribs 251 is separately, annularly and protrudingly disposed on an inner side of the water inlet pipe 25.

A pipe connecting groove 31 passes through the water inlet connector 30. A tooth 311 is protrudingly and annularly disposed inside the pipe connecting groove 31. The limiting protruded rib 21 of the water guiding pipe 20 is disposed inside the pipe connecting groove 31. The fastening dot 243 disposed on the positioning ring 24 is engaged with the tooth 311. The fixing teeth end 22 is protruded outside the water inlet connector 30.

A connecting ring 41 passes through a center of the limiting connector 40. The connecting ring 41 is pivotally disposed on the water inlet connector 30. Limiting spaces 42 pass through the limiting connector 40 annularly.

Figure 5:
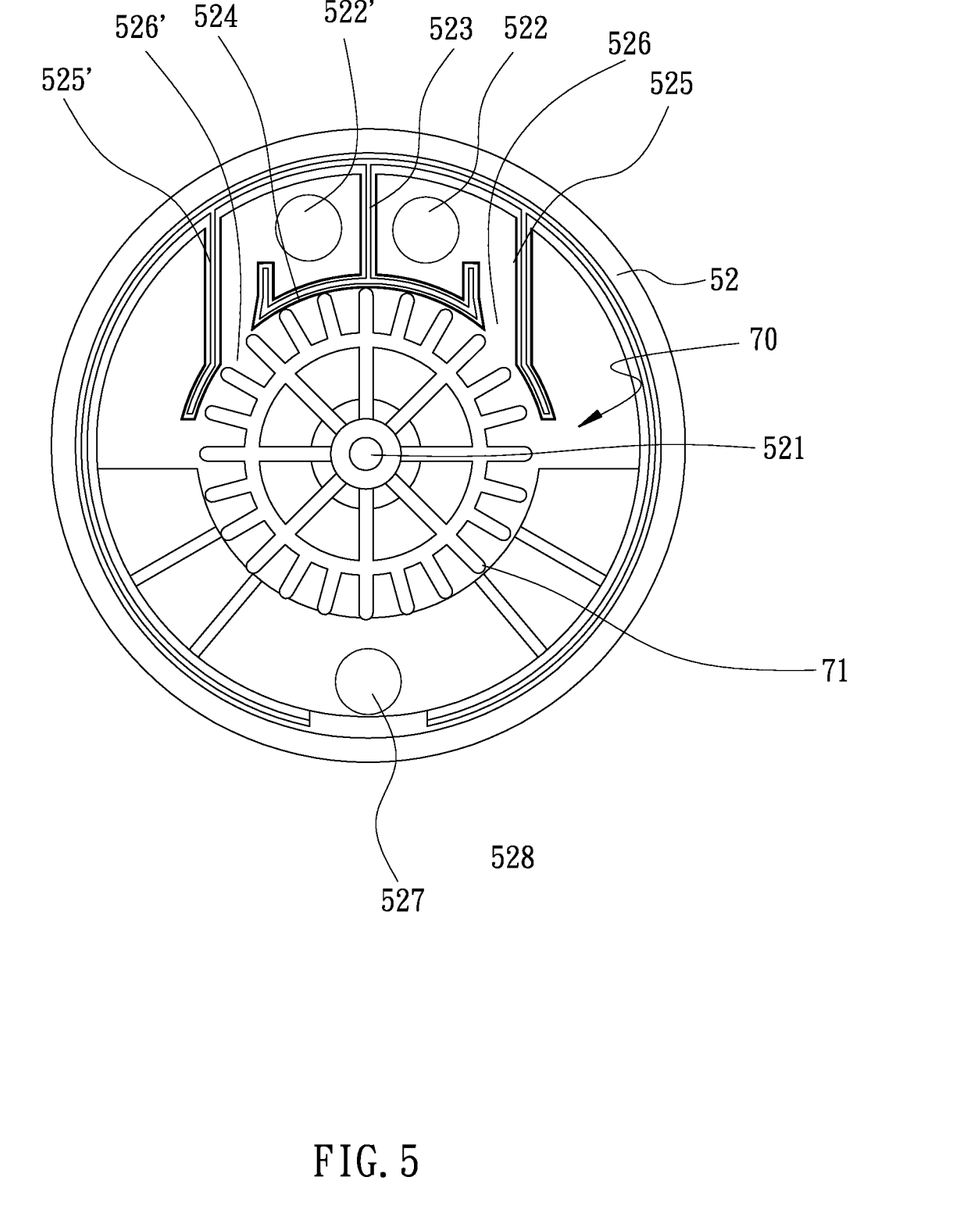
FIG. 5 is a top view of a cover of the present invention.

For the movable seat 50, please refer to FIG. 5, which is a top view of a cover of the present invention. The movable seat 50 is composed of a bottom box 51 and a cover 52. An accommodating space 53 is formed between the bottom box 51 and the cover 52. A teeth hole 511 passes through a bottom of the bottom box 51 for the fixing teeth end 22 to go through the accommodating space 53. A pivotal connecting hole 512 is disposed by a side of the teeth hole 511. A limiting rod 513 is protrudingly disposed by an outer side of the pivotal connecting hole 512. The limiting rod 513 is disposed inside the limiting space 42. An axial hole 521 passes through a center of the cover 52. A plurality of stopping ribs 5211 is annularly disposed inside the axial hole 521. A first water outlet hole 522 and a second water outlet hole 522' pass through a side of the cover 51. The first water outlet hole 522 and the second water outlet hole 522' are disposed by two sides of an axis of the cover 52. A separating board 523 is disposed between the first water outlet hole 522 and the second water outlet hole 522'. A stopping board 524 is horizontally and extendedly disposed by two sides of an end of the separating board 523 near the axial hole 521. The stopping board 524 is disposed in front of the first water outlet hole 522 and the second water outlet hole 522'. A first guiding board 525 and a second guiding board 525' are protrudingly disposed on the cover 52 by the first water outlet hole 522 and the second water outlet hole 522' respectively. The first guiding board 525 and the second guiding board 525' and the separating board 523 are roughly parallel to each other. A first water passage 526 is formed between the first guiding board 525 and the stopping board 524. A second water passage 526' is formed between the second guiding board 525' and the stopping board 524. The first water passage 526 and the second water passage 526' are parallelly disposed by two sides of the axis of the cover 52. A pressure relief hole 527 is penetratedly disposed on the cover 52.

Figure 6:
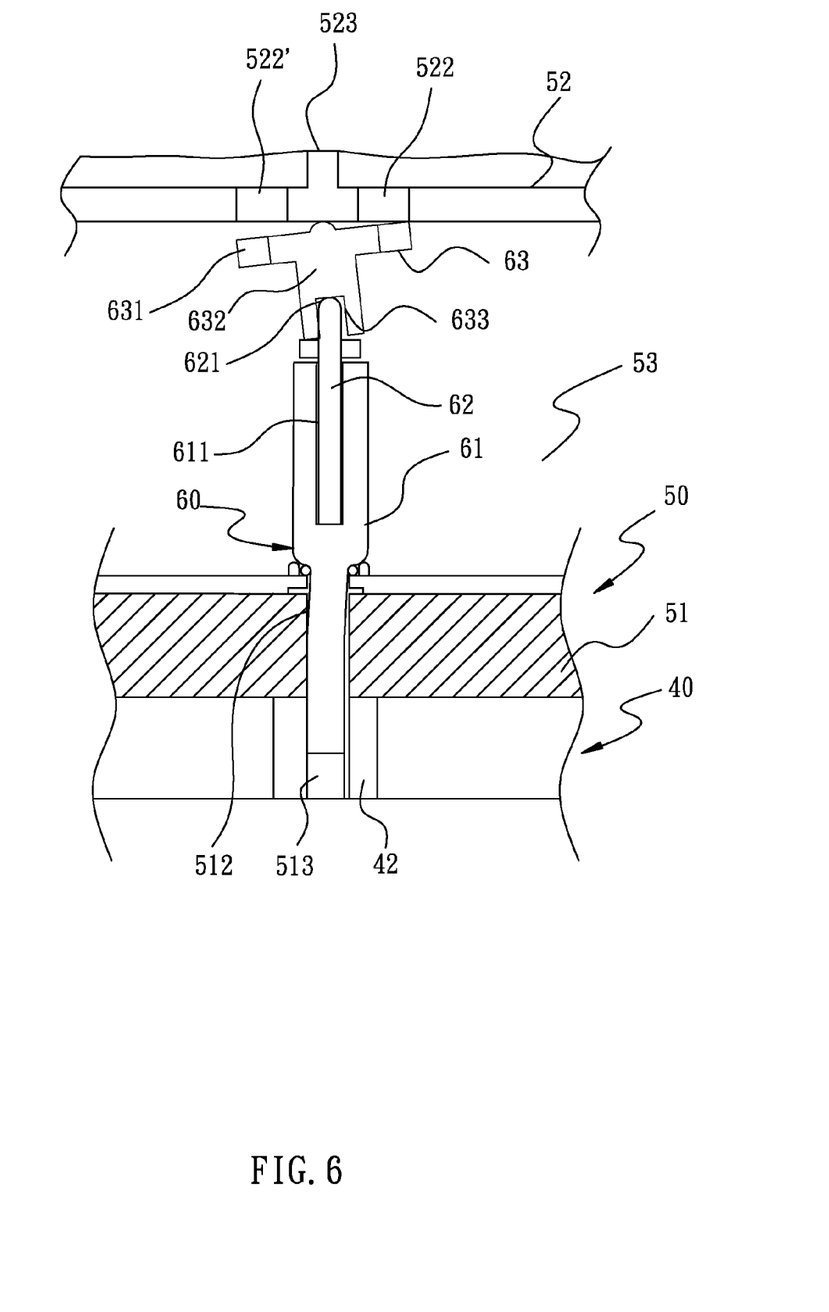
FIG. 6 is an illustrative view of an water inlet switching device of the present invention in motion.

Please refer to FIG. 6, which is an illustrative view of the water inlet switching device of the present invention in motion. The water inlet switching device 60 comprises a push rod 61, a connecting rod 62 and a wiggling piece 63. An end of the push rod 61 is pivotally connected with the pivotal connecting hole 512 of the bottom box 51. The push rod 61 is limited inside the limiting space 42. A connecting groove 611 is concavely disposed at another end of the push rod 61. The connecting rod 62 is pivotally disposed inside the connecting groove 611. A diameter of the connecting rod 62 is smaller than a hole diameter of the connecting groove 611 so that the connecting rod 62 can wiggle deflectively inside the connecting groove 611. A round connecting head 621 is disposed at a front end of the connecting rod 62. The wiggling piece 63 is pivotally disposed on the cover 52 corresponding to the first water outlet hole 522 and the second water outlet hole 522'. A pressing surface 631 is disposed on a top of the wiggling piece 63 for selectively covering the first water outlet hole 522 or the second water outlet hole 522'. A force saving portion 632 is disposed below the pressing surface 631. An accommodating groove 633 is disposed below the force saving portion 632. The connecting head 621 of the connecting rod 62 presses inside the accommodating groove 633 of the wiggling piece 63.

The gear wheel set 70 comprises an impeller 71 and a transmission gear set 72. The impeller 71 is pivotally disposed on the axial hole 521 of the cover 52. The first water passage 526 and the second water passage 526' are tangent with the impeller 71. The transmission gear set 72 is engaged with the impeller 71 and the fixing teeth end 22.

Figure 7:
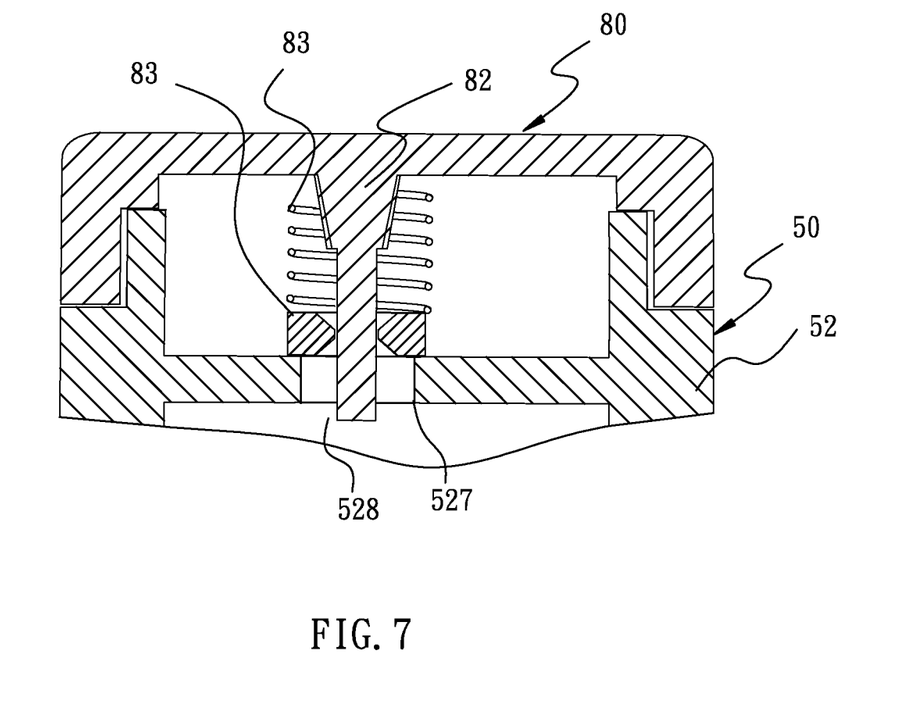
FIG. 7 is a partial sectional view of the cover and a water outlet connector of the present invention.

Please refer to FIG. 7, which is a partial sectional view of the cover and the water outlet connector of the present invention. The water outlet connector 80 covers on the cover 52. A water outlet hole 81 is penetratedly disposed on the water outlet connector 80. A pressure relief rod 82 is protrudingly disposed on the water outlet connector 80 corresponding to the pressure relief hole 527 of the cover 52. An elastic element 83 and a pressure relief pad 84 are sleeved around the pressure relief rod 82. The elastic element 83 presses the pressure relief pad 84 elastically on the pressure relief hole 527 tightly.

In order to further understand the structures, techniques and expected effectiveness of the present invention specifically and thoroughly, the ways for using the present invention is described below.

Please refer to FIGS. 3 to 6. When the sprinkler is being used, water comes in from the water inlet pipe 25. The stopping ribs 251 block large objects and make the water to flow more smoothly. When the water flows into the water guiding pipe 20, the stopping portion 23 on the fixing teeth end 22 also block large objects. The stopping ribs 5211 inside the axial hole 521 prevent stones and sand from flowing in. The water flows into the accommodating space 53 after passing through the water guiding pipe 20, and flows into the first water outlet hole 522 or the second water outlet hole 522'. The separating board 523, the stopping board 524 and the first guiding board 525 or the second guiding board 525' guide the water to the first water passage 526 or the second water passage 526'. Because the first water passage 526 or the second water passage 526' is tangent with the impeller 71; when the water flows out, it pushes along the rotating direction of the impeller 71 to make the impeller 71 to rotate more evenly and smoothly, and the gear wheel set 70 to rotate more smoothly. Thereby, the sprinkler wiggles more smoothly and evenly to sprinkle water. After the water current drives the impeller 71 to rotate, the water flows out from the water outlet hole 81 of the water outlet connector 80 to sprinkle. At the same time, the impeller 71 drives the transmission gear set 72 to rotate. Then, the transmission gear set 72 drives the fixing teeth end 22 to rotate and to make the movable seat 50 to wiggle; thereby, the sprinkler rotates. The positioning ring 24 of the water guiding pipe 20 is engagedly disposed on the limiting protruded rib 21, and the fastening dot 243 of the positioning ring 24 and the tooth 32 of the water inlet connector 30 engage with each other; therefore, the water inlet connector 30 and the water guiding pipe 20 do not separate from each other easily. More than one of the fastening dot 243 can be disposed to enhance the engaging strength. When the movable seat 50 rotates to reach the end of the limiting space 42 of the limiting connector 40, the limiting rod 513 and the push rod 61 touch a side of the limiting space 42, and the push rod 61 deflects. At this moment, the connecting rod 62 deflects to change the position of the wiggling piece 63 so that the water flows into the first water outlet hole 522 or the second water outlet hole 522'. Thereby, the rotating direction of the impeller 71 changes and makes the sprinkler to rotate in a different direction. Because the connecting rod 62 is pivotally disposed in the connecting groove 611, and the diameter of the connecting rod 62 is smaller than the hole diameter of the connecting groove 611; when the connecting rod 62 changes direction, the force is partially converted into momentum of displacement. Thereby, the pressure received by the connecting rod 62 is reduced. The round connecting head 621 on top of the connecting rod 62 allows it to move more smoothly in the accommodating groove 633 of the wiggling piece 63. The force saving portion 632 disposed between the accommodating groove 633 and the pressing surface 631 of the wiggling piece 63 generates a torque effect when the connecting rod 62 pushes against the accommodating groove 633. Thereby, the pressing surface 631 is driven more effectively with less force. As a result, the driving force is reduced and the lifespan of the product is enhanced.

Furthermore, please refer to FIG. 7. When the water pressure in the accommodating space 53 is larger than the elasticity of the elastic element 83, the water pressure pushes the pressure relief pad 84 away to allow the water to flow to the water outlet hole 81 from the pressure relief hole 527 to relieve pressure.

Note that the specifications relating to the above embodiments should be construed as exemplary rather than as limitative of the present invention, with many variations and modifications being readily attainable by a person of average skill in the art without departing from the spirit or scope thereof as defined by the appended claims and their legal equivalents.

What is claimed is:

1. An improved sprinkler structure at least comprising:
a water guiding pipe, a limiting protruded rib disposing at an end of the water guiding pipe, a fixing teeth end disposing at another end of the water guiding pipe, a positioning ring being engagedly disposed on the limiting protruded rib, a fastener being elastically disposed inside the positioning ring, the fastener being limited by the limiting protruded rib, a fastening dot being disposed on an outer side of the positioning ring;
a water inlet connector, a pipe connecting groove passing through the water inlet connector, a tooth being protrudingly and annularly disposed inside the pipe connecting groove, the water guiding pipe having the limiting protruded rib disposing inside the pipe connecting groove, the fastening dot disposing on the positioning ring being engaged with the tooth, the fixing teeth end being protruded outside the water inlet connector;
a limiting connector, a connecting ring passing through a center of the limiting connector, the connecting ring being pivotally disposed on the water inlet connector, limiting spaces passing through the limiting connector annularly;
a movable seat composed of a bottom box and a cover, an accommodating space being formed between the bottom box and the cover, a teeth hole passing through a bottom of the bottom box for the fixing teeth end to go through the accommodating space, a pivotal connecting hole being disposed by a side of the teeth hole, a limiting rod being protrudingly disposed by an outer side of the pivotal connecting hole, the limiting rod being disposed inside the limiting space, an axial hole passing through a center of the cover, a first water outlet hole and a second water outlet hole passing through a side of the cover, the first water outlet hole and the second water outlet hole disposing by two sides of an axis of the cover, a separating board being disposed between the first water outlet hole and the second water outlet hole, a stopping board being horizontally and extendedly disposed by two sides of an end of the separating board near the axial hole, the stopping board being disposed in front of the first water outlet hole and the second water outlet hole, a first guiding board and a second guiding board being protrudingly disposed on the cover by the first water outlet hole and the second water outlet hole respectively, the first guiding board and the second guiding board and the separating board are roughly parallel to each other, a first water passage being formed between the first guiding board and the stopping board, a second water passage being formed between the second guiding board and the stopping board, the first water passage and the second water passage being parallelly disposed by two sides of the axis of the cover, a pressure relief hole being penetratedly disposed on the cover;

a water inlet switching device comprising a push rod, a connecting rod and a wiggling piece, an end of the push rod being pivotally connected with the pivotal connecting hole of the bottom box, the push rod being limited inside the limiting space, a connecting groove being concavely disposed at another end of the push rod, the connecting rod being pivotally disposed inside the connecting groove, a diameter of the connecting rod being smaller than a hole diameter of the connecting groove so that the connecting rod wiggling deflectively inside the connecting groove, the wiggling piece being pivotally disposed on the cover corresponding to the first water outlet hole and the second water outlet hole, the wiggling piece being disposed on top of the connecting rod, the wiggling piece selectively opening the first water outlet hole or the second water outlet hole;

a gear wheel set comprising an impeller and a transmission gear set, the impeller being pivotally disposed on the axial hole of the cover, the first water passage and the second water passage being tangent with the impeller, the transmission gear set being engaged with the impeller and the fixing teeth end; and a water outlet connector covering on the cover, a water outlet hole being penetratedly disposed on the water outlet connector, a pressure relief rod being protrudingly disposed on the water outlet connector corresponding to the pressure relief hole of the cover, an elastic element and a pressure relief pad being sleeved around the pressure relief rod, the elastic element pressing the pressure relief pad elastically on the pressure relief hole tightly.

2. The improved sprinkler structure as claimed in claim 1, wherein a stopping portion is disposed at and end surface of the fixing teeth end of the water guiding pipe, a water inlet pipe is further connected with an outer side of the positioning ring, a plurality of stopping ribs is separately, annularly and protrudingly disposed on an inner side of the water inlet pipe.

3. The improved sprinkler structure as claimed in claim 1, wherein a plurality of positioning grooves is concavely and annularly disposed on the limiting protruded rib, a positioning protruded piece is protrudingly disposed on an inner side of the positioning ring corresponding to the positioning groove.

4. The improved sprinkler structure as claimed in claim 1, wherein a pressing surface is disposed on a top of the wiggling piece for selectively covering the first water outlet hole or the second water outlet hole, a force saving portion is disposed below the pressing surface, an accommodating groove is disposed below the force saving portion, the connecting rod presses inside the accommodating groove.

5. The improved sprinkler structure as claimed in claim 1, wherein stopping ribs are annularly disposed inside the axial hole of the cover.

* * * * *